US008670945B2

(12) United States Patent
van Schie

(10) Patent No.: US 8,670,945 B2
(45) Date of Patent: Mar. 11, 2014

(54) APPARATUS AND METHOD FOR PRODUCT MOVEMENT PLANNING TO SUPPORT SAFETY MONITORING IN INVENTORY MANAGEMENT SYSTEMS

(75) Inventor: Adrianus Leonardus David van Schie, Honselersdijk (NL)

(73) Assignee: Honeywell International Inc., Morristown, NJ (US)

( * ) Notice: Subject to any disclaimer, the term of this patent is extended or adjusted under 35 U.S.C. 154(b) by 750 days.

(21) Appl. No.: 12/895,541

(22) Filed: Sep. 30, 2010

(65) Prior Publication Data

US 2012/0084025 A1  Apr. 5, 2012

(51) Int. Cl.
*G01F 23/00* (2006.01)
(52) U.S. Cl.
USPC ............ 702/55; 700/37; 700/45; 73/53.01
(58) Field of Classification Search
USPC .................... 702/55; 700/37, 45; 73/53.01
See application file for complete search history.

(56) References Cited

U.S. PATENT DOCUMENTS

| 3,801,426 A | 4/1974 | Putman et al. |
| 3,886,036 A | 5/1975 | Dahlin |
| 4,616,308 A | 10/1986 | Morshedi et al. |
| 5,069,779 A | 12/1991 | Brown et al. |
| 5,351,184 A | 9/1994 | Lu et al. |
| 5,406,842 A | 4/1995 | Locke |
| 5,442,359 A | 8/1995 | Rubin |
| 5,566,065 A | 10/1996 | Hansen et al. |
| 5,570,282 A | 10/1996 | Hansen et al. |
| 5,682,309 A | 10/1997 | Bartusiak et al. |
| 5,704,011 A | 12/1997 | Hansen et al. |
| 5,718,060 A | 2/1998 | Mori |
| 5,740,033 A | 4/1998 | Wassick et al. |
| 5,774,089 A | 6/1998 | Bamler et al. |
| 6,056,781 A | 5/2000 | Wassick et al. |
| 6,253,129 B1 | 6/2001 | Jenkins et al. |
| 6,278,899 B1 | 8/2001 | Piche et al. |
| 6,473,670 B1 | 10/2002 | Huhtelin |

(Continued)

FOREIGN PATENT DOCUMENTS

| DE | 100 40 180 A1 | 4/2002 |
| EP | 0907117 A | 4/1999 |

(Continued)

OTHER PUBLICATIONS

International Search Report dated Mar. 2, 2012 in connection with International Patent Application No. PCT/US2011/053366, 5 pages.

(Continued)

*Primary Examiner* — Jonathan C Teixeira Moffat
*Assistant Examiner* — Hien Vo

(57) ABSTRACT

A method includes obtaining information identifying a predicted trajectory of material-based measurements associated with a transfer of material. The method also includes obtaining actual material-based measurements during the transfer of the material and determining whether the actual material-based measurements fall outside of the predicted trajectory. The method further includes identifying a problem with the transfer of the material if at least one of the actual material-based measurements falls outside of the predicted trajectory. The method may also include generating the predicted trajectory of the material-based measurements using historical data associated with one or more prior transfers, such as historical data associated with at least one pump to be used during the transfer of the material. The actual material-based measurements could include measurements of a level and/or a volume of the material in a tank.

20 Claims, 3 Drawing Sheets

(56) References Cited

U.S. PATENT DOCUMENTS

| | | |
|---|---|---|
| 6,605,185 B2 | 8/2003 | Sasaki et al. |
| 6,629,458 B1 | 10/2003 | Westerling et al. |
| 6,826,521 B1 | 11/2004 | Hess et al. |
| 7,035,767 B2 | 4/2006 | Archer et al. |
| 7,664,561 B1 | 2/2010 | Chen et al. |
| 7,702,519 B2 | 4/2010 | Boyden et al. |
| 2001/0021900 A1 | 9/2001 | Kassmann |
| 2002/0052862 A1 | 5/2002 | Scott et al. |
| 2003/0167839 A1 | 9/2003 | Burger et al. |
| 2004/0049295 A1 | 3/2004 | Wojsznis et al. |
| 2004/0196177 A1 | 10/2004 | Billington et al. |
| 2005/0187643 A1 | 8/2005 | Sayyar-Rodsari et al. |
| 2005/0190098 A1 | 9/2005 | Bridgelall et al. |
| 2006/0157148 A1 | 7/2006 | Hillam et al. |
| 2007/0079804 A1 | 4/2007 | Nakayama |
| 2007/0168170 A1 | 7/2007 | Thomas |
| 2008/0077257 A1 | 3/2008 | Peterson et al. |
| 2008/0109100 A1 | 5/2008 | Macharia et al. |
| 2008/0140227 A1 | 6/2008 | Attarwala |
| 2008/0188957 A1 | 8/2008 | Cutler |
| 2008/0264591 A1 | 10/2008 | Backstrom et al. |
| 2009/0240480 A1 | 9/2009 | Baramov |
| 2009/0248325 A1 | 10/2009 | Humphrey |
| 2009/0282892 A1 | 11/2009 | Sai |
| 2009/0319059 A1 | 12/2009 | Renfro et al. |
| 2010/0037673 A1 | 2/2010 | Wicht et al. |

FOREIGN PATENT DOCUMENTS

| | | |
|---|---|---|
| EP | 0710902 B1 | 9/1999 |
| JP | 58-47219 A | 3/1983 |
| JP | 60-73311 A | 4/1985 |
| JP | 2-236421 A | 9/1990 |
| NL | 1032192 | 7/2006 |
| WO | WO 2004/053521 A1 | 6/2004 |
| WO | WO 2006/086376 A3 | 8/2006 |
| WO | WO 2007/053007 A1 | 5/2007 |
| WO | WO 2007/111498 A2 | 10/2007 |
| WO | WO 2008/010702 A1 | 1/2008 |
| WO | WO 2008/064421 A1 | 6/2008 |

OTHER PUBLICATIONS

Written Opinion of International Searching Authority dated Mar. 2, 2012 in connection with International Patent Application No. PCT/US2011/053366, 4 pages.

Timothy F. Murphy et al., "Transition Control of Paper-making Processes: Paper Grade Change," Proceedings of the 1999 IEEE International Conference on Control Applications, Aug. 22-27, 1999, pp. 1278-1283.

"Performance MD (DVE) Grade Change User's Manual," Honeywell, Mar. 2002, 36 pages.

"Performance MultiVariable MD Version 3.0 User's Manual," Honeywell, Jun. 2003, 309 pages, See esp. Section 8.

Yang Wang, et al., Optimal Grade Transition Control for Polymerization Reactors, Computers & Chemical Engineering, Oxford, GB, vol. 24, Jan. 2000, pp. 1555-1561.

Hiroya Sekia, et al., Industrial Application of a Nonlinear Model Predictive Control to Polymerization Reactors, Cont. Eng. Practice, Oxford, GB, vol. 9, Jan. 2001, pp. 819-828.

Paavo Viitamaki, Hybrid Modeling of Paper Machine Grade Changes, [Online] Jan. 2004, URL:http://lib.tkk.ft/Diss/2004/isbn951227/1362/isbn9512271362.pdf.

Hauge T. A., et al., Application and Roll-out of Infinite Horizon MPC Employing a Nonlinear Mechanistic Model to Paper Machines, Oxford, GB, vol. 15, No. 2, Mar. 2005, pp. 201-213.

Smook, Gary A., Handbook for Pulp & Paper Technologies, Angus Wilde Publications, 1992, pp. 323-328.

Dr. Joseph Lu, "Fundamentals of RMPCT", for Honeywell 95' User's Group Meeting, Jun. 14, 1995, 70 pages.

Charles Zhan, "Some of the New Improvements for RMPCT R200", Presented in APC engine group, Dec. 2000, Honeywell, 38 pages.

J. G. Renfro et al., "Simultaneous Optimization and Solution of Systems Described by Differential/Algebraic Equations", Comput. Chem. Engng., vol. 11, No. 5, pp. 503-511, 1987.

International Standard, Petroleum and liquid petroleum products—Measurement of level and temperature in storage tanks by automatic methods, Part 3: Measurement of level in pressurized storage tanks (non-refrigerated), 1st Edition, Nov. 15, 2002, 21 pages.

"Servo Gauge 854ATG" Product Sheet, Enraf B.V., 4 pages.

"Level sensor", wikipedia.org, Aug. 2, 2008, 8 pages.

"HERMetic Sensor", Honeywell Enraf, 5 pages.

APPARATUS AND METHOD FOR PRODUCT MOVEMENT PLANNING TO SUPPORT SAFETY MONITORING IN INVENTORY MANAGEMENT SYSTEMS

TECHNICAL FIELD

This disclosure relates generally to inventory management systems. More specifically, this disclosure relates to an apparatus and method for product movement planning to support safety monitoring in inventory management systems.

BACKGROUND

Various facilities routinely include tanks for storing liquid materials and other materials. For example, storage tanks are routinely used in tank farms and other storage facilities to store oil or other materials. As another example, oil tankers and other liquid transport vessels routinely include numerous tanks storing oil or other materials.

Oftentimes, it is necessary or desirable to measure the level of material in a tank, such as during loading of material into the tank or unloading of material from the tank. Among other approaches, radar gauges and servo gauges have been used to measure the material level in a tank. A radar gauge typically transmits radar signals towards material in a tank and receives radar signals reflected off the surface of the material in the tank. A servo gauge typically raises and lowers a displacer located inside a tank, where the displacer's weight changes when submerged in the material.

On occasion, radar gauges, servo gauges, and other level-measuring gauges stop functioning properly. For example, the displacer of a servo gauge could become stuck within a tank. Similarly, pumps or other equipment could malfunction during the transfer of material into or out of a tank. These and other problems could allow volatile or other dangerous material to escape, resulting in environmental damage and injury or even death to nearby personnel. As a result, level-measuring gauges, pumps, and other equipment often include circuitry or other components for periodically testing the equipment or otherwise ensuring that the equipment is operating properly.

SUMMARY

This disclosure provides an apparatus and method for product movement planning to support safety monitoring in inventory management systems.

In a first embodiment, a method includes obtaining information identifying a predicted trajectory of material-based measurements associated with a transfer of material. The method also includes obtaining actual material-based measurements during the transfer of the material. The method further includes determining whether the actual material-based measurements fall outside of the predicted trajectory. In addition, the method includes identifying a problem with the transfer of the material if at least one of the actual material-based measurements falls outside of the predicted trajectory In a second embodiment, an apparatus includes a processing unit configured to obtain information identifying a predicted trajectory of material-based measurements associated with a transfer of material. The apparatus also includes an interface configured to obtain actual material-based measurements during the transfer of the material. The processing unit is further configured to determine whether the actual material-based measurements fall outside of the predicted trajectory and to identify a problem with the transfer of the material if at least one of the actual material-based measurements falls outside of the predicted trajectory.

In a third embodiment, a computer readable medium embodies a computer program. The computer program includes computer readable program code for obtaining information identifying a predicted trajectory of material-based measurements associated with a transfer of material. The computer program includes also computer readable program code for obtaining actual material-based measurements during the transfer of the material. The computer program further includes computer readable program code for determining whether the actual material-based measurements fall outside of the predicted trajectory. In addition, the computer program includes computer readable program code for identifying a problem with the transfer of the material if at least one of the actual material-based measurements falls outside of the predicted trajectory.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
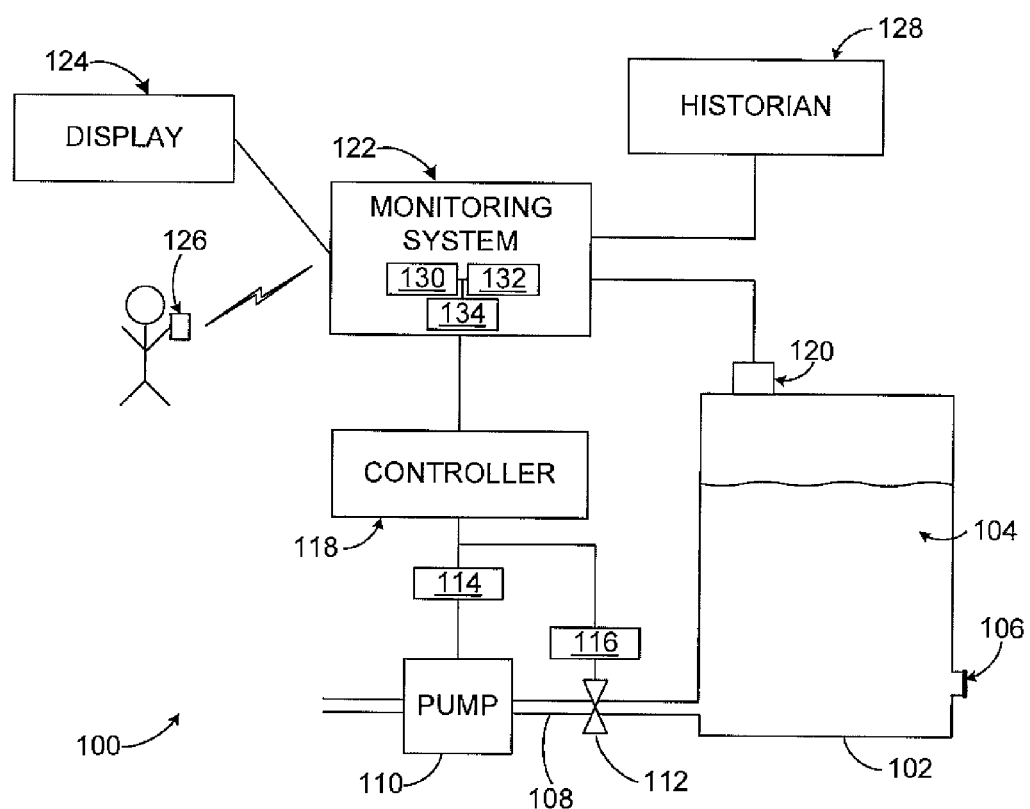
FIG. 1 illustrates an example inventory management system using product movement planning to support safety monitoring according to this disclosure.
Figure 2:
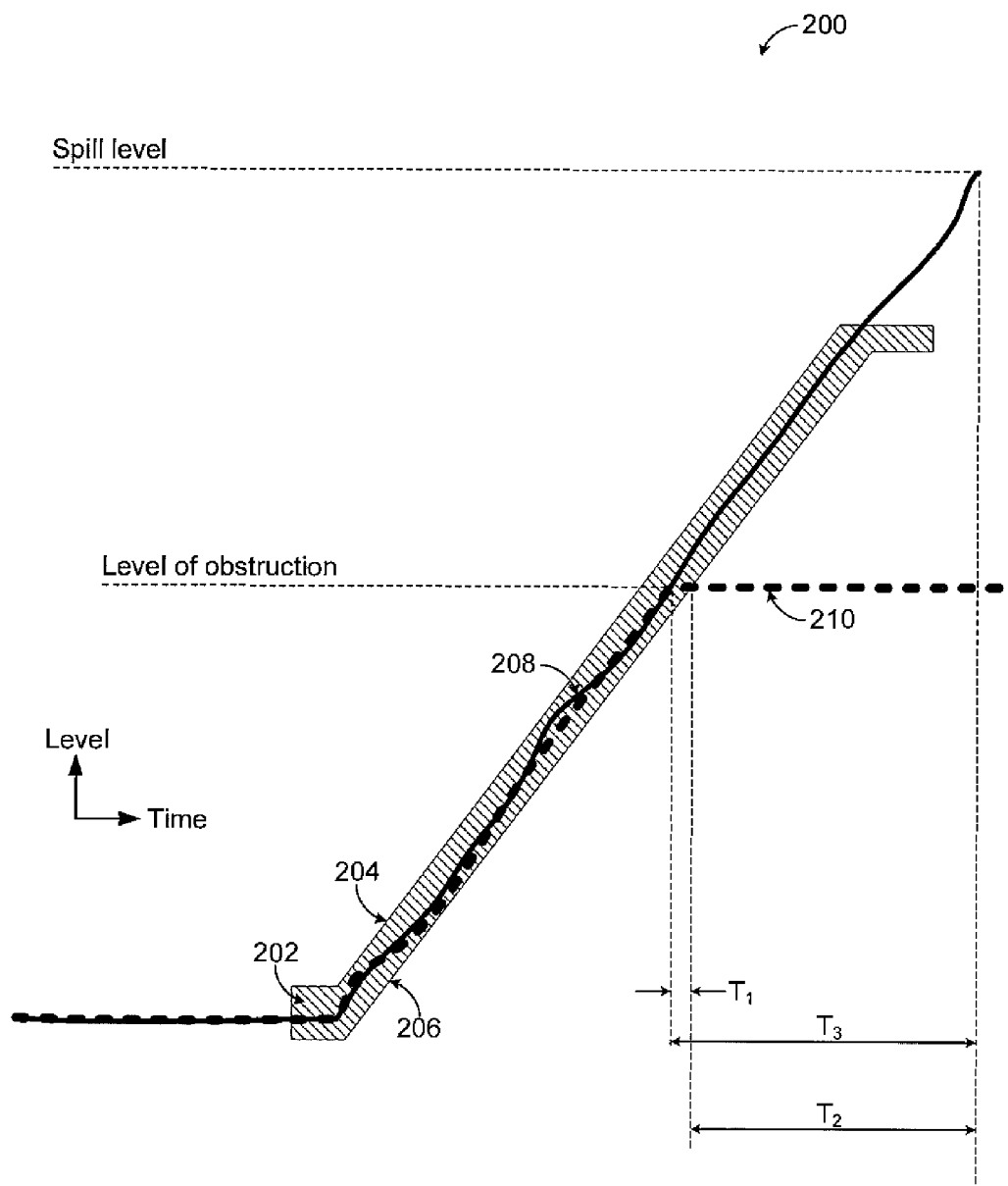
FIG. 2 illustrates example product movement planning to support safety monitoring according to this disclosure.
Figure 3:
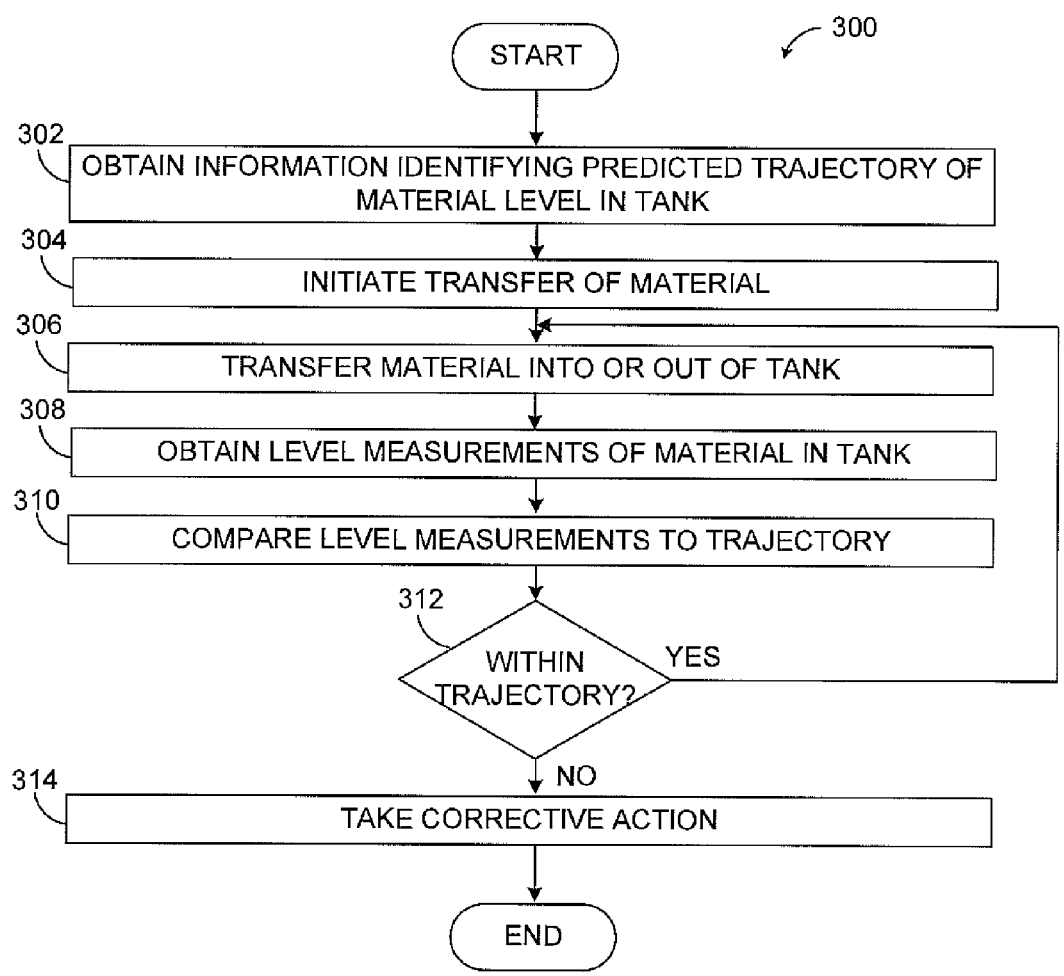
FIG. 3 illustrates an example method for using product movement planning to support safety monitoring according to this disclosure.

FIGS. 1 through 3, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

FIG. 1 illustrates an example inventory management system 100 using product movement planning to support safety monitoring according to this disclosure. As shown in FIG. 1, the system 100 includes at least one tank 102 that can store one or more materials 104. The tank 102 represents any suitable structure for receiving and storing at least one liquid or other material 104. The tank 102 could, for example, represent an oil storage tank or a tank for storing other liquid(s) or other material(s). The tank 102 could also have any suitable shape and size. Further, the tank 102 could form part of a larger structure. The larger structure could represent any fixed or movable structure containing or associated with one or more tanks 102, such as a movable tanker vessel, railcar, or truck or a fixed tank farm.

In this example, the tank 102 includes at least one hatch 106, such as a maintenance hatch. The hatch 106 could, for example, represent a door or other opening that can be opened to provide access to the interior of the tank 102. The hatch 106 could then be closed and sealed to prevent material 104 from leaking or otherwise escaping the tank 102 through the hatch 106.

The material 104 flows into and out of the tank 102 through one or more transfer pipes 108. The flow of material 104 through the transfer pipe(s) 108 is controlled using one or more pumps 110 and one or more valves 112. The pump 110 can pump the material 104 from an external source into the tank 102 through the transfer pipe 108 and the valve 112. The pump 110 can also pump the material 104 out of the tank 102 through the valve 112 and the transfer pipe 108 to an external destination. The valve 112 can be opened and closed to control the flow of the material 104 through the transfer pipe 108.

The pump 110 is associated with a pump actuator 114, which controls the operation of the pump 110 in order to adjust the pumping of material 104 into or out of the tank 102. Similarly, the valve 112 is associated with a valve actuator 116, which opens and closes the valve 112 to adjust the flow of material through the transfer pipe 108.

The transfer pipe 108 includes any suitable tube or similar structure for transporting material between locations. The pump 110 includes any suitable structure for pumping moving material. The valve 112 includes any suitable structure for controlling a flow of material. The pump actuator 114 includes any suitable structure for controlling the operation of at least one pump. The valve actuator 116 includes any suitable structure for opening and closing at least one valve.

At least one controller 118 controls the operation of the pump actuator 114 and the valve actuator 116, thereby controlling the pump 110 and the valve 112. The controller 118 could, for example, receive commands from a site operator to begin loading or unloading the material 104 in the tank 102, as well as commands such as setting the loading or unloading rate or other characteristics of the transfer. The controller 118 includes any suitable structure for controlling equipment for loading or unloading a tank.

A level sensor 120 measures the level of material 104 in the tank 102. The level sensor 120 can use any suitable technique to measure the level of material 104 in the tank 102. For example, the level sensor 120 could represent a non-contact sensor, such as a radar gauge or other gauge that operates using wireless signals. The level sensor 120 could also represent a contact sensor, such as a servo gauge or other gauge that physically contacts the material 104. The level sensor 120 includes any suitable structure for measuring the level of material in a tank.

Due to the natural of the material 104 to be stored in the tank 102 (such as flammable, explosive, or toxic material), safety is very important in the system 100. During operations, many things can go wrong: the tank 102 could leak, the transfer pipe 108 could leak, the hatch 106 could be left open, the pump 110 or valve 112 could malfunction, or the level sensor 120 could get stuck or otherwise fail. The early detection of these or other kind of events can be very important to protect against business or environmental damage and personal injury or death. Many techniques for identifying problems focus on establishing that equipment used during the transfer of material (like the level sensor 120) is operating correctly. In other words, these techniques attempt to prove the health status of the equipment.

In accordance with this disclosure, problems in the system 100 are detected using a site operator's transfer plan. Before the material 104 is moved into or out of the tank 102, the site operator defines a transfer plan, which identifies the expected or predicted movement of the material 104 into or out of the tank 102. The transfer plan could, for example, identify when the transfer of material 104 is to begin, the flow (pump capacity) to be used, and how much material 104 is to be transferred. The transfer plan therefore predicts the amount or level of material 104 in the tank 102 during the transfer. Effectively, the transfer plan identifies the expected path or trajectory of the material level in the tank 102 as measured by the level sensor 120.

When the transfer actually occurs, the system 100 monitors the measured level of material 104 in the tank 102 and verifies whether the measured material level matches the predicted material level. A leaking tank 102 or pipe 108, a malfunctioning pump 110 or valve 112, an open hatch 106, a failed level sensor 120, or other problem could cause the measured level of material 104 to deviate from the predicted trajectory, triggering an alarm or other corrective action. This approach therefore uses the operator's transfer plan as a reference for safety checks and does not depend on all sorts of instrument checks to verify that various equipment is operating properly.

To support this functionality, a monitoring system 122 receives the level measurements from the level sensor 120. The monitoring system 122 also receives information defining the transfer plan or other information identifying the expected level of material 104 in the tank 102 during a transfer. The monitoring system 122 can compare the actual level of material 104 in the tank 102 against the predicted level and take corrective action if the actual level differs from the predicted level by a threshold amount (such as by a threshold percentage or level difference). The corrective action could include presenting an alarm message on a display screen 124, transmitting a warning message to a user's wireless device 126, triggering an audible warning signal, or generating some other suitable indicator. The threshold amount that triggers the corrective action could be customizable.

In some embodiments, the creation of the transfer plan or the predicted level's trajectory may be based on historical data, such as data collected by a historian 128. The historical data could, for example, represent data identifying the rate at which material 104 flows through the transfer pipe 108 at different settings of the pump 110. As a particular example, the historical data could include level measurements taken during loading or unloading of the tank 102 at different settings of the pump 110 and valve 112. The historical data could also represent information identifying the pumping capacity of the pump 110. A statistical module or other logic implemented or used by the monitoring system 122 could predict product movement trends (trajectories) based on the characteristics of previous transfers stored in the historian 128. The historian 128 includes any suitable structure for storing historical data associated with the system 100, such as a database.

In this way, the monitoring system 122 can monitor the actual level of material 104 in the tank 102 and compare the actual level to an expected trajectory. While some variation of the actual level from the predicted trajectory may be expected, any excessive variation could be indicative of some problem in the system 100 that is affecting the material level. This allows the monitoring system 122 to identify problems in the system 100 without requiring each individual piece of equipment to undergo testing or performance monitoring (although they could).

The monitoring system 122 could represent any suitable computing or processing system or device, such as a computing device, a process controller, or other system or device. In particular embodiments, the monitoring system 122 includes at least one processing unit 130, such as a microprocessor, microcontroller, digital signal processor, field programmable gate array, or application-specific integrated circuit. The monitoring system 122 can also include at least one memory 132 storing instructions and data used, generated, or collected by the processing unit(s) 130 and at least one network interface 134 facilitating communication with external devices or systems, such as the components 118-120, 124-128. The interface 134 could include an Ethernet interface, a radio frequency (RF) transceiver, or other wired or wireless interface. As a particular example, the functionality of the monitoring system 122 could be implemented in one or more software modules, which could be installed on new or existing systems.

Although FIG. 1 illustrates one example of an inventory management system 100 using product movement planning to support safety monitoring, various changes may be made to FIG. 1. For example, a system could include any number of tanks, hatches, pipes, pumps, valves, actuators, sensors, monitoring systems, and other components. Also, the makeup and arrangement of the inventory management system 100 are for illustration only. Components could be added, omitted, combined, subdivided, or placed in any other suitable configuration according to particular needs. As a particular example, the monitoring system 122 could implement the functionality of the process controller 118. In addition, FIG. 1 illustrates one operational environment in which product movement planning to support safety monitoring can be used. This functionality could be used in any other suitable device or system.

FIG. 2 illustrates example product movement planning to support safety monitoring according to this disclosure. In FIG. 2, a graph 200 plots a material level in a tank 102 over time. An example trajectory 202 is shown as a hatched area in FIG. 2. The trajectory 202 identifies the predicted path of the material level in the tank 102 during loading of the tank 102. The trajectory 202 defines a range of levels vertically for each instance in time, where upper and lower margins of the trajectory 202 are defined by lines 204-206 on top and bottom of the hatched area. As long as the actual material level stays within this range, the monitoring system 122 may view the material level as being acceptable. If the actual material level exits this range, the monitoring system 122 may view the material level as being indicative of a problem and take corrective action.

In this example, line 208 represents the actual level of the material 104 in the tank 102, and line 210 represents the level measurements taken by the level sensor 120. As can be seen here, the line 208 remains within the trajectory 202, which indicates that the trajectory 202 accurately predicts the material level. The line 210 remains within the trajectory 202 until an obstruction is reached, such as where a displacer of the level sensor 120 gets stuck on an obstruction within the tank 102. When that occurs, the line 210 becomes generally flat, indicating that the level measurements have become relatively constant at a fixed level. This occurs even though the line 208 continues to increase, meaning the actual level of material 104 in the tank 102 continues to rise. When the line 210 leaves the hatched area representing the trajectory 202, this means the actual level measurements differ from the predicted measurements by more than a threshold amount, and an alarm can be triggered or other corrective action can be taken.

Note that the reason the actual level measurements differ from the predicted measurements need not be identified here. Rather, the monitoring system 122 can determine that some type of problem exists with the transfer of material 104, regardless of whether the problem is a leaking tank or pipe, a stuck servo displacer, a malfunctioning pump, or other problem. The monitoring system 122 can notify the appropriate personnel of the problem, allowing the personnel to take steps to identify and resolve the problem. Optionally, the monitoring system 122 could include logic for assisting in the identification of the faulty system component(s).

As shown in FIG. 2, the area or difference between the margins for the trajectory 202 has a direct relationship with the amount of time it takes to identify an anomaly. In this example, the time between (i) the displacer getting stuck at the obstruction level and (ii) the line 210 exiting the hatched area is denoted $T_1$. Smaller areas or differences between the margins for the trajectory 202 would result in smaller times $T_1$, while larger areas or differences between the margins for the trajectory 202 would result in larger times $T_1$. When a problem occurs, the length of time between identification of the problem and an accident (such as overflow) is denoted $T_2$. The total time between occurrence of the problem and an accident is denoted $T_3$. Ideally, the size of the area or difference between the margins can be set by an operator so that the time $T_1$ is long enough to avoid most or all false alarms while still providing adequate time $T_2$ to avoid accidents.

In some embodiments, the graph 200 can be presented to an operator as part of a graphical user interface. The operator could use controls on the graphical user interface to create a time/level plot defining a trajectory 202 to be used during a later material transfer. Controls could also be used to access historical data and invoke statistical functions in order to generate an estimated trajectory 202 of the material level. Once the transfer actually starts, the graphical user interface could display the line 210 over the trajectory 202, allowing the operator to monitor the progress of the transfer and to see if the actual level measurements are staying within the margins of the trajectory 202.

In addition, the monitoring system 122 could generate a "score" or other value indicating how well an operator created a trajectory 202. The score could be calculated based on how well the trajectory 202 tracked the actual level measurements, as well as the difference between the upper and lower margins of the trajectory 202 (since it is easier to create a trajectory 202 with margins that are farther apart). The score could be used in any suitable manner. For example, the scores could be used to identify whether a particular operator requires additional training or to identify better performing operators.

Although FIG. 2 illustrates one example of product movement planning to support safety monitoring, various changes may be made to FIG. 2. For example, the trajectory 202, lines 204-210, and times $T_1$-$T_3$ in FIG. 2 are for illustration only. Any other trajectory 202 having user-defined or other margins could be used, and the margins need not be constant. Also, the actual material level and level measurements vary depending on the circumstances. Further, the times $T_1$-$T_3$ vary depending on the circumstances, such as when the time $T_3$ is larger or smaller depending on when the interruption to the level measurements occurs. In addition, there may be problems other than obstructions that interrupt measurements of the material level in the tank 102.

FIG. 3 illustrates an example method 300 for using product movement planning to support safety monitoring according to this disclosure. As shown in FIG. 3, information identifying a predicted trajectory of a material level in a tank during a transfer is obtained at step 302. This could include, for example, the monitoring system 122 receiving information defining the trajectory 202 from an operator using a graphical user interface. This could also include the monitoring system 122 or the operator using historical data from the historian 128 to generate the trajectory 202 by predicting the level of material 104 in the tank 102 during an upcoming transfer. The transfer of material is initiated at step 304, and material is loaded into or unloaded from a tank at step 306. This could include, for example, the controller 118 causing the pump 110 to pump material 104 into or out of the tank 102 through the valve 112.

One or more level measurements of the material in the tank are obtained at step 308. This could include, for example, the monitoring system 122 receiving the level measurements from the level sensor 120. The level measurements could be continuous, near-continuous, or intermittent (such as at a specified interval). The level measurements are compared against the trajectory at step 310. This could include, for example, the monitoring system 122 comparing the level measurements received from the level sensor 120 against the range of values defined by the margins of the trajectory 202.

A determination is made whether the level measurements are within the trajectory at step 312. This could include, for example, the monitoring system 122 determining whether one or more level measurements from the level sensor 120 fall outside the range of values defined by the margins of the trajectory 202. The number of level measurements required to fall outside the trajectory 202 before identifying a problem could be fixed or configurable by an operator. The monitoring system 122 could determine that a single level measurement outside the trajectory 202 is excessive, or the monitoring system 122 could require that multiple level measurements fall outside the trajectory 202 before determining that a problem exists.

If the level measurements are within the trajectory, the process returns to step 306 to continue the transfer of material into or out of the tank.

Otherwise, if the level measurements are outside the trajectory, corrective action is taken at step 314. This could include, for example, the monitoring system 122 sounding an audible alarm, displaying a warning message, or causing the controller 118 to shut down the pump 110 or close the valve 112. Any other or additional action(s) could be taken by the monitoring system 100.

Although FIG. 3 illustrates one example of a method 300 for using product movement planning to support safety monitoring, various changes may be made to FIG. 3. For example, while shown as a series of steps, various steps in FIG. 3 could overlap, occur in parallel, occur in a different order, or occur multiple times.

It may be noted that while the above description has described the use of level measurements from the level sensor 120 to identify a problem, other measurements could also be used. For example, the monitoring system 122 could operate using volume measurements received from a volume sensor, where the volume measurements identify the volume of material 104 in the tank 102. The monitoring system 122 could also use a trajectory of predicted volume measurements and compare the actual volume measurements against the trajectory to identify a problem. In general, the monitoring system 122 could use any "material-based measurements" in order to identify a problem, where the material-based measurements represent any measurements based on the amount of material 104 in a tank 102.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "obtain" and its derivatives refer to any acquisition of data or other item, whether acquired from an external source or internally (such as through internal generation of the data or other item). The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   using at least one processing device:
   obtaining information identifying a predicted trajectory of material-based measurements associated with a transfer of material;
   obtaining actual material-based measurements during the transfer of the material;
   determining whether the actual material-based measurements fall outside of the predicted trajectory; and
   identifying a problem with the transfer of the material if at least one of the actual material-based measurements falls outside of the predicted trajectory;
   wherein the predicted trajectory is defined by first and second margins identifying a range of acceptable material-based measurements over time; and
   wherein determining whether the actual material-based measurements fall outside of the predicted trajectory comprises determining whether each actual material-based measurement falls outside of the range of acceptable material-based measurements.

2. The method of claim 1, wherein the actual material-based measurements comprise at least one of: measurements of a level of the material in a tank and measurements of a volume of the material in the tank.

3. The method of claim 1, further comprising:
   generating the predicted trajectory of the material-based measurements using historical data associated with one or more prior transfers.

4. The method of claim 3, wherein generating the predicted trajectory comprises generating the predicted trajectory using historical data associated with at least one pump to be used during the transfer of the material.

5. The method of claim 1, wherein obtaining the information identifying the predicted trajectory comprises receiving information associated with the predicted trajectory using a graphical user interface configured to receive input from a user.

6. The method of claim 1, further comprising:
generating a score based on (i) how well the actual material-based measurements remain within the range of acceptable material-based measurements and (ii) a size of a difference between the first and second margins.

7. The method of claim 1, further comprising:
presenting the predicted trajectory and the actual material-based measurements to a user.

8. An apparatus comprising:
a processing unit configured to obtain information identifying a predicted trajectory of material-based measurements associated with a transfer of material; and
an interface configured to obtain actual material-based measurements during the transfer of the material;
wherein the processing unit is further configured to determine whether the actual material-based measurements fall outside of the predicted trajectory and to identify a problem with the transfer of the material if at least one of the actual material-based measurements falls outside of the predicted trajectory;
wherein the predicted trajectory is defined by first and second margins identifying a range of acceptable material-based measurements over time; and
wherein the processing unit is configured to determine whether the actual material-based measurements fall outside of the predicted trajectory by determining whether each actual material-based measurement falls outside of the range of acceptable material-based measurements.

9. The apparatus of claim 8, wherein the actual material-based measurements comprise at least one of: measurements of a level of the material in a tank and measurements of a volume of the material in the tank.

10. The apparatus of claim 8, wherein the processing unit is further configured to generate the predicted trajectory of the material-based measurements using historical data associated with one or more prior transfers.

11. The apparatus of claim 10, wherein the processing unit is configured to generate the predicted trajectory using historical data associated with at least one pump to be used during the transfer of the material.

12. The apparatus of claim 8, wherein the processing unit is configured to obtain the information identifying the predicted trajectory by receiving information associated with the predicted trajectory from a user via a graphical user interface.

13. The apparatus of claim 8, wherein the processing unit is further configured to present the predicted trajectory and the actual material-based measurements to a user.

14. The apparatus of claim 8, wherein the processing unit, in response to identifying the problem with the transfer of the material, is further configured to at least one of: sound an audible alarm, display a warning message on a display, transmit a message to an operator device, and adjust operation of equipment associated with the transfer of the material.

15. The apparatus of claim 8, wherein the processing unit is further configured to generate a score based on (i) how well the actual material-based measurements remain within the range of acceptable material-based measurements and (ii) a size of a difference between the first and second margins.

16. A non-transitory computer readable medium embodying a computer program, the computer program comprising computer readable program code for:
obtaining information identifying a predicted trajectory of material-based measurements associated with a transfer of material;
obtaining actual material-based measurements during the transfer of the material;
determining whether the actual material-based measurements fall outside of the predicted trajectory; and
identifying a problem with the transfer of the material if at least one of the actual material-based measurements falls outside of the predicted trajectory;
wherein the predicted trajectory is defined by first and second margins identifying a range of acceptable material-based measurements over time; and
wherein the computer readable program code for determining whether the actual material-based measurements fall outside of the predicted trajectory comprises computer readable program code for determining whether each actual material-based measurement falls outside of the range of acceptable material-based measurements.

17. The computer readable medium of claim 16, wherein the computer program further comprises computer readable program code for generating the predicted trajectory of the material-based measurements using historical data associated with one or more prior transfers.

18. The computer readable medium of claim 17, wherein the computer readable program code for generating the predicted trajectory comprises computer readable program code for generating the predicted trajectory using historical data associated with at least one pump to be used during the transfer of the material.

19. The computer readable medium of claim 16, wherein the computer program further comprises computer readable program code for generating a score based on (i) how well the actual material-based measurements remain within the range of acceptable material-based measurements and (ii) a size of a difference between the first and second margins.

20. The computer readable medium of claim 16, wherein the computer readable program code for obtaining the information identifying the predicted trajectory comprises computer readable program code for receiving information associated with the predicted trajectory using a graphical user interface configured to receive input from a user.

* * * * *